Robert E. Zinn
INVENTOR.

Dec. 10, 1968 R. E. ZINN 3,415,654
DEEP VAT FERMENTATION OF BEER
Filed June 10, 1965 5 Sheets-Sheet 2
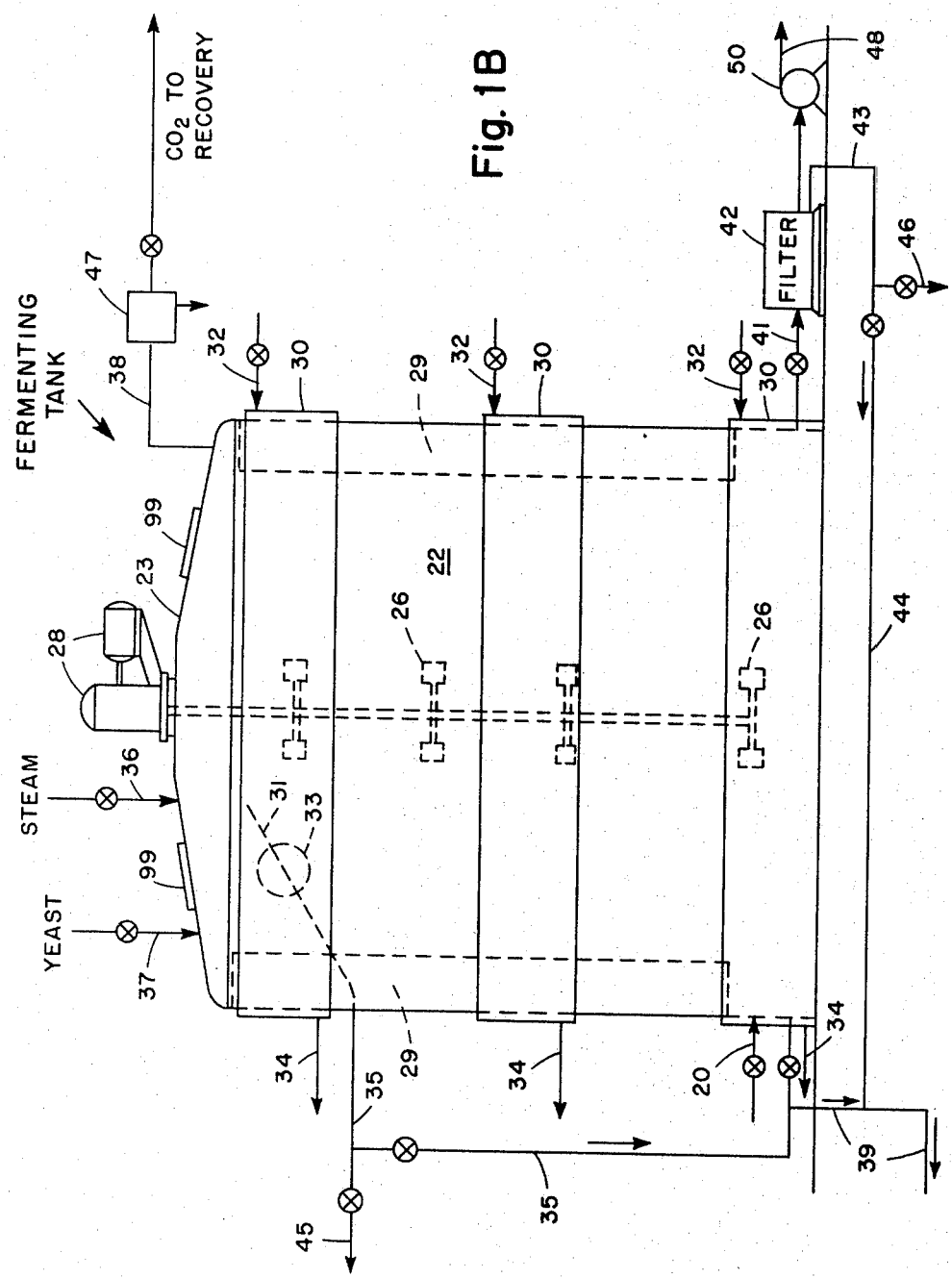
Robert E. Zinn
INVENTOR.

Dec. 10, 1968  R. E. ZINN  3,415,654
DEEP VAT FERMENTATION OF BEER
Filed June 10, 1965  5 Sheets-Sheet 3

Robert E. Zinn
INVENTOR.

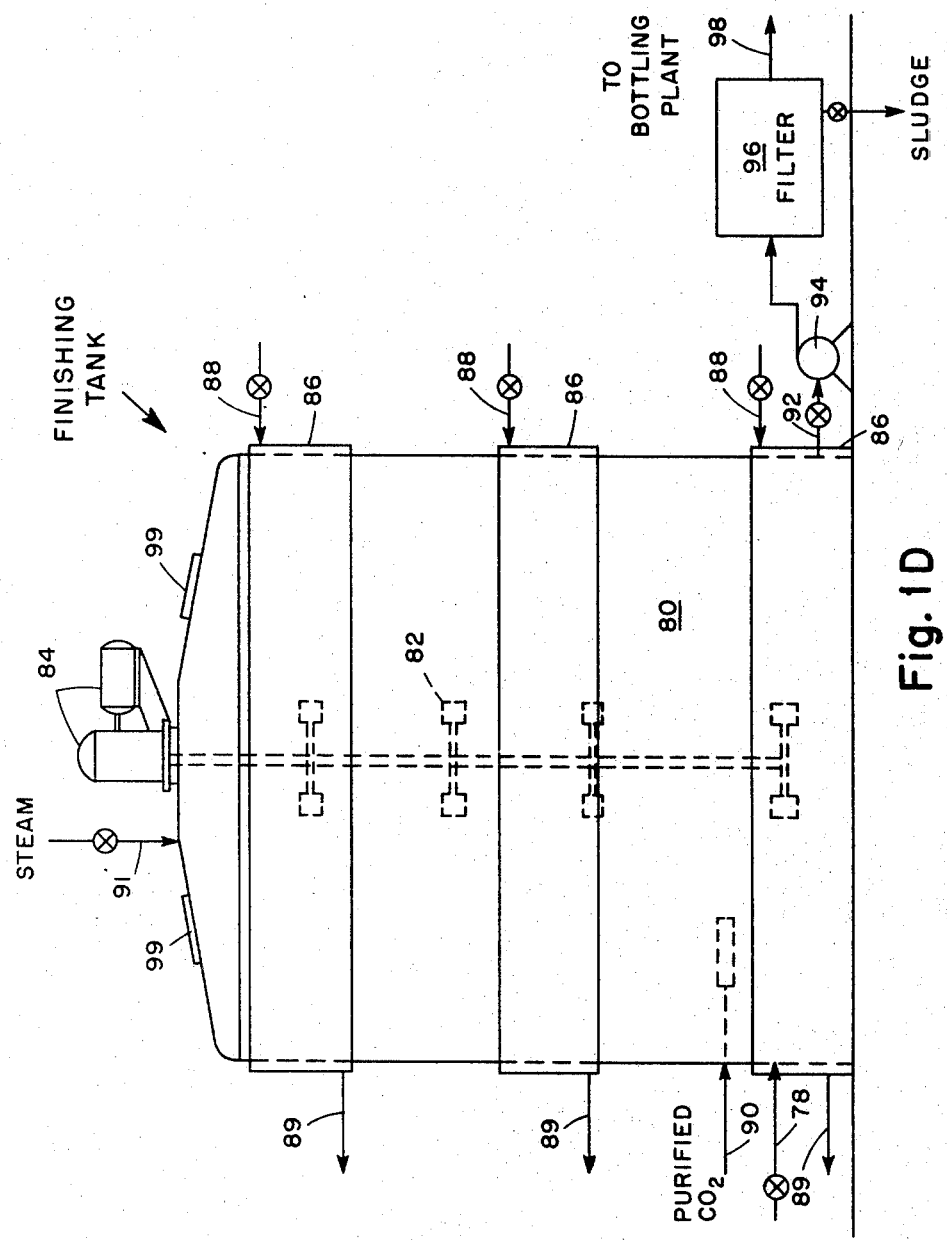

Dec. 10, 1968    R. E. ZINN    3,415,654
DEEP VAT FERMENTATION OF BEER
Filed June 10, 1965    5 Sheets-Sheet 5

Robert E. Zinn
INVENTOR.

3,415,654
DEEP VAT FERMENTATION OF BEER
Robert E. Zinn, Lexington, Mass., assignor, by mesne assignments, to Falstaff Brewing Corporation, St. Louis, Mo., a corporation of Delaware
Continuation-in-part of application Ser. No. 107,356, May 3, 1961. This application June 10, 1965, Ser. No. 462,882
8 Claims. (Cl. 99—31)

ABSTRACT OF THE DISCLOSURE

A beer-making process wherein a yeast and wort mixture is fermented as a liquid body having a depth in excess of 20 feet, the reciprocal ratio of the open surface area to volume of the body being at least 20.

---

Figure 1A:
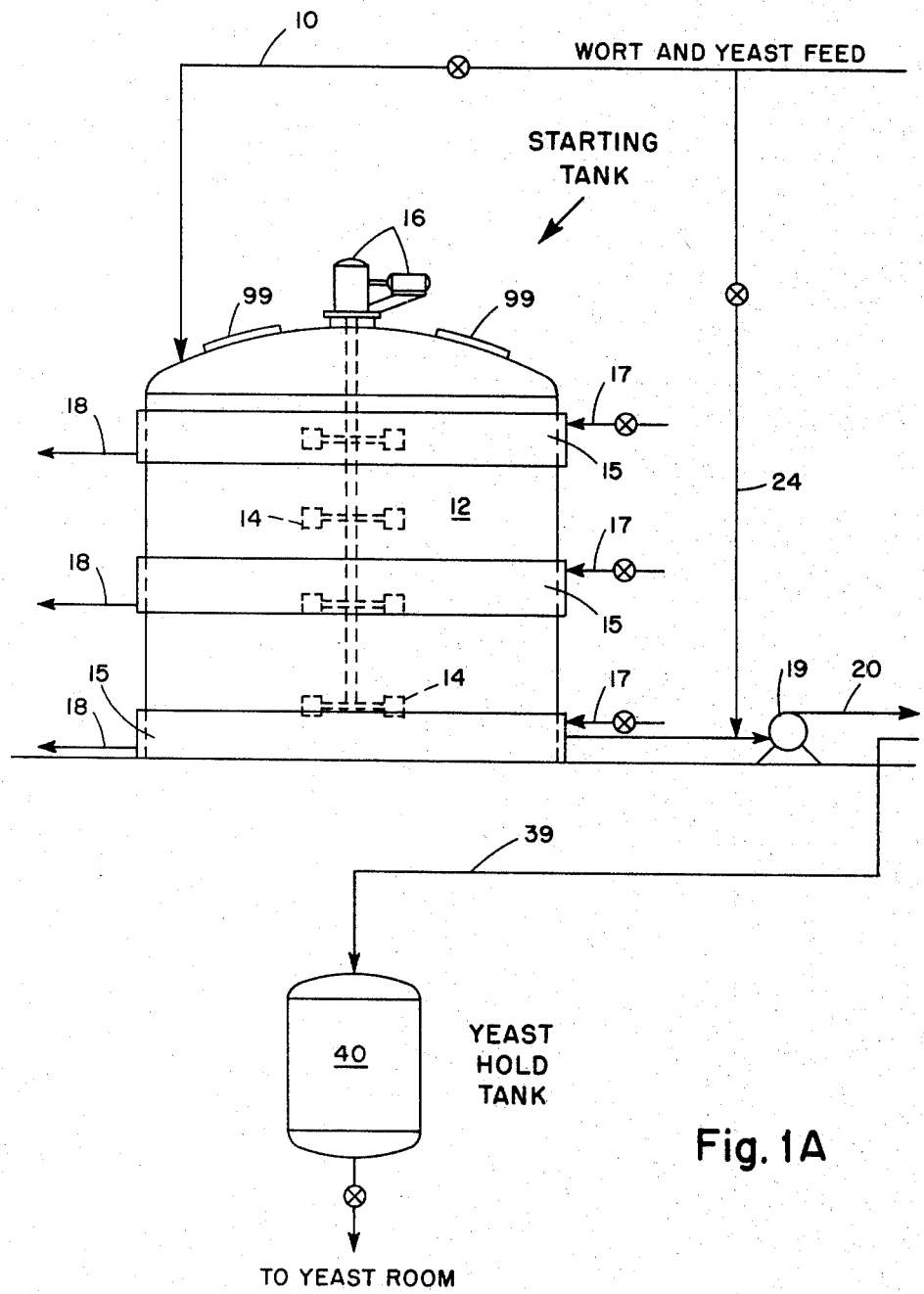

This application is a continuation-in-part of my earlier filed application Ser. No. 107,356 of May 3, 1961, now abandoned.

This invention relates to an improved process for making beer, and to apparatus for carrying out the process. By the term "beer" is meant the various fermented malt beverages commonly included within that term, e.g., lager, ale, bock, porter, and stout. The fermentation of malt beverages is similar in many respects to fermentations in general; however, the consumption of the product by humans to satisfy thirst and for pleasure imposes unique and severe organoleptic criteria on the product.

Beer is now, and for many years has been typically made in a multiplicity of fermentation tanks installed within cold storage buildings known in the brewing industry as cellars. These tanks are usually in the form of cylinders with their axes horizontal, or vertical, although they may be rectangular or of other shape; in any event they are spaced for circulation of cooling air around them and to permit access by the operators. The cellars are customarily constructed with several floors to accommodate a considerable number of the tanks both vertically and horizontally.

The tanks for cellars are always relatively shallow in vertical dimensions, ranging between 6 and 12½ feet in depth, with an average of 9 feet. The beer depth in the tanks is approximately 1½ feet less than the tank depth. The tank depth is determined partly by the way in which the cellars are constructed, whereby a convenient distance between the floors of the building is provided. It is also due to the fact that it has never been believed possible to carry on beer fermentation satisfactorily in tanks of considerably greater depth. Attempts made to carry out fermentation in much deeper tanks has generally resulted in poorer taste and uneven quality of the product, so that it was unsuitable for consumption.

There are a number of disadvantages in the present process and apparatus for making beer in cellars. For example, it is impossible or at least impractical to provide individual temperature control for the various tanks, or to steam-sterilize them. This is of course due to the fact that the entire cellar is kept at a desired low temperature and any action to change the temperature in, or to steam-sterilize, any one or more of the tanks would upset the temperature conditions within the rest of the cellar. Also, the cellar itself must be a substantial structure in order to hold the considerable weight of the filled tanks. The outside walls of the cellar must be insulated in order to insure effective temperature control within the cellar. Cork or foam glass insulation is ordinarily used for the purpose. Outside air is forced into and out of the cellar; this air is treated, usually by filtering and sometimes by washing and/or sterilizing (depending upon the impurities in the outside air), and is usually cooled, as by passing it over cooling coils. Cooling of the cellar is alternatively accomplished by unit coolers, or by brine- or ammonia-cooled pipe coils over which the treated air is passed. It is also generally necessary to dehumidify the air in the cellars, e.g., with lithium chloride, in order to minimize rust and corrosion which would otherwise be quite damaging and would require heavy repair and upkeep expenses.

In order to obtain product uniformity and lowered labor cost per barrel, the size of fermenters relative to brew size are preferably such that one tank should at least handle one brew. The foam generated in the fermentation process is proportional, all other factors being equal, to the volume of the brew; i.e., the depth of foam is directly proportional to the depth of the fermenting liquid. As previously set forth, the conventional fermentation systems, and particularly the vessels, are expensive difficult to manage and do not conform to efficient engineering design. If a given volume is confined to a relatively shallow tank, the foam will be distributed over a large area whereas if the same volume is confined to a deep tank, the foam layer is correspondingly deeper and is considerably easier to skim or remove selectively as by continuous overflow. To a large extent, most of the bitter and other undesirable flavor principles in the fermenting brew are concentrated in the foam together with other and more pleasant flavors. Moreover, beer taste is expedited by using deep fermenters which provide deep foam because the flavor character can be controlled and the degree of blandness extended beyond the limits normaly obtained by conventional fermentation.

It has now been found, in accordance with the present invention, that the fermentation of beer, to produce a highly acceptable product, can be carried out advantageously without the use of cellars and in thermally insulated and temperature-controlled individual tanks which provide the requisite greater beer depth and thus the greater foam depth. Despite the greater static pressure in the brew at these greater depths, the normal course of yeast-wort fermentation can unexpectedly be achieved, although hitherto it has generally been considered impossible or undesirable. Additionally, a volume of fermenting beer confined to a deep tank has a smaller surface area exposed to air than the same volume in a shallow tank. Preferably, the reciprocal ratio of surface area to the volume of liquid should be at least 20, and may exceed 60 or more. It will be noted that depth alone controls the surface area to volume ratio of the beer liquid.

A principal object of the present invention is therefore to provide a method of and apparatus for deep fermentation of beer with improved control of foam removal.

It is an object of the invention to provide a process of deep fermentation where the reciprocal ratio of surface area to the volume of liquid is at least 20. It is another object of the invention to provide a deep fermentation process wherein the reciprocal ratio of surface area to volume of liquid exceeds 40.

The object of this invention is attained by providing one or more deep fermentation tanks or fermenters of sufficient size to provide a beer depth of at least 20 feet, each tank being jacketed with suitable temperature control means adequate to assure the desired temperatures within the tanks. These tanks are supplied with wort and yeast and other conventional ingredients prepared in the usual fashion for supplying to beer fermentation tanks. Provisions are also made for thoroughly mixing the ingredients as fed to the fermentation tanks, and preferably also for circulation of the contents of such tanks during fermentation, so that the yeast may be effectively distributed throughout the fermenting mass to provide complete uniformity, thus assisting in assuring desired taste characteristics of the fermented product. Each fermenter is provided with means for selectively removing foam from the brew surface.

Figure 1C:
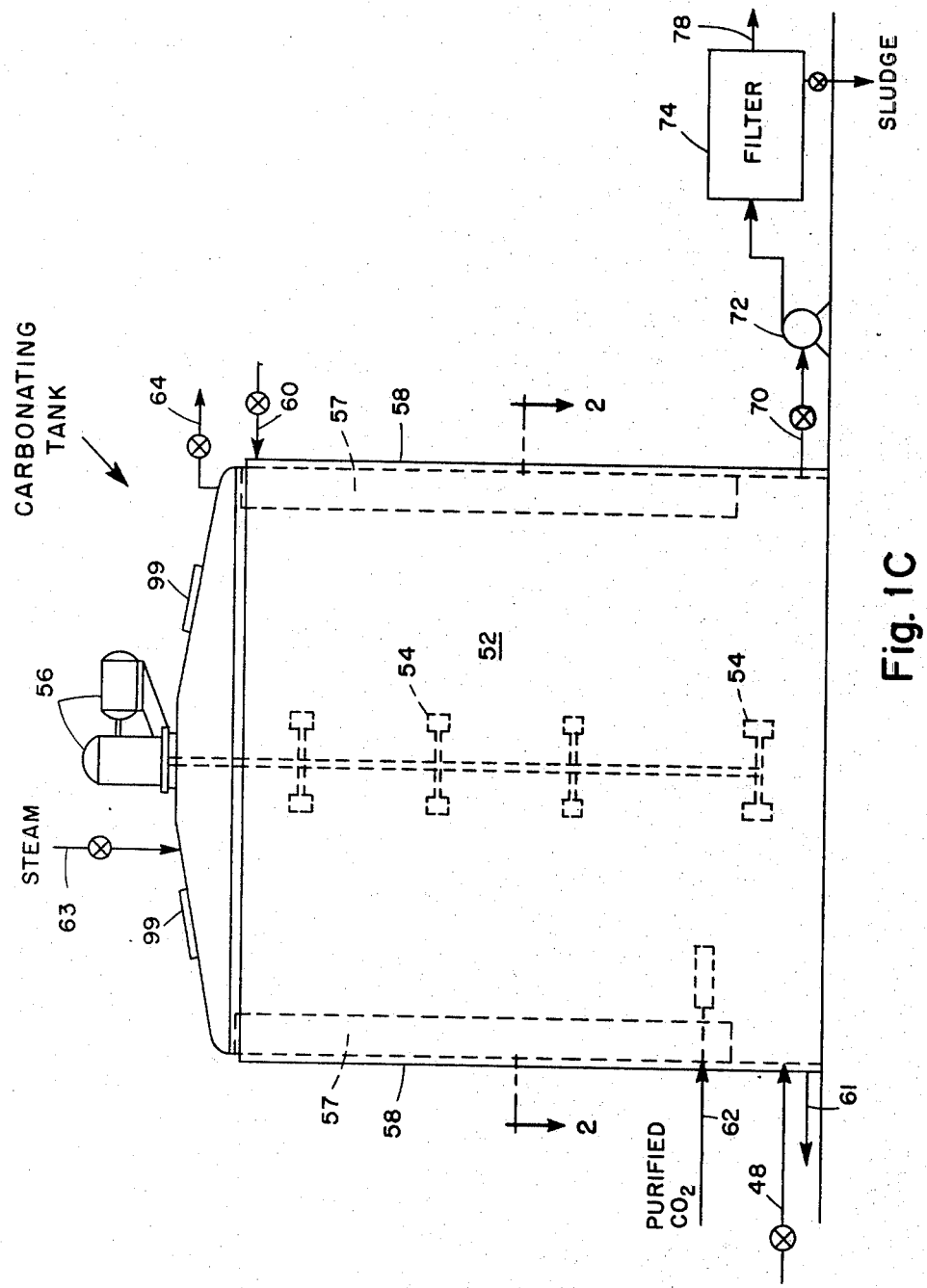
Figure 2:
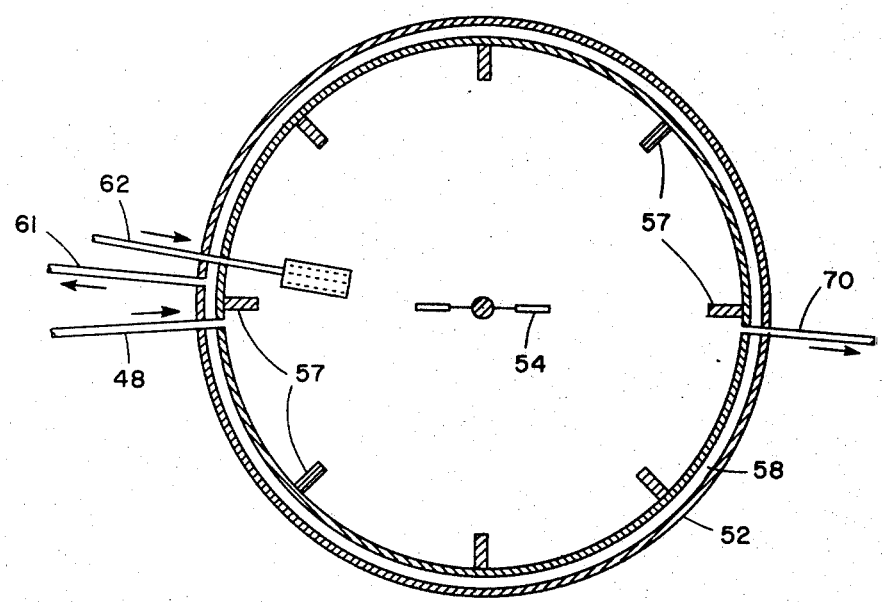

Suitable apparatus for carrying out the process of this invention is shown in the accompanying drawings, which are intended to be illustrative rather than limiting, and wherein FIGS. 1A–1D show a side elevation of the apparatus and FIG. 2 is a cross-sectional view of one of the tanks, taken along line 2—2 of FIG. 1C. As there shown, wort and yeast feed mixture, prepared in conventional fashion, is introduced through line 10 to fermentation starting tank 12 equipped with agitator 14 driven by conventional drive means 16. Tank 12 is provided with jacket means 15, through which brine, glycol, ammonia, or other temperature-controlling medium is circulated, this medium being introduced through line 17 and discharged through line 18, for temperature adjustment and recirculation. From tank 12 the liquid is conveyed by pump 19 through valve-controlled line 20 to the fermenting tank 22 of this invention. Alternatively, the wort and yeast feed mixture may be led through valve-controlled line 24 from line 10 through pump 19 and line 20 directly to tank 22.

Tank 22 is provided with cover 23 and is of sufficient height to permit a beer depth of at least twenty feet. Accordingly, the distance from the periphery of cover 23 to the bottom of tank 22 should be at least about twenty-two feet. Tank 22 is preferably provided with an agitator 26 driven by conventional driving means 28 mounted at the top of the tank. Spaced around the inside of the tank are baffles 29, extending from adjacent the top of the tank but spaced away from the bottom as shown. Jacket means 30 is provided around the outside of tank 22. This jacket means may surround the entire periphery of the tank (as shown for the carbonating tank 52, described below) or may, as shown, cover only a part of the outside of the tank. The exact arrangement will depend on the temperature conditions prevailing in the area where the tanks are located, on the temperature of the cooling medium supplied, on the precise characteristics desired in the final product, and on other factors, as will be obvious to those skilled in the art. Brine, glycol, ammonia, or other suitable temperature regulating medium is supplied to jacket means 30 through appropriate lines 32 and is removed through outlet lines 34, for temperature adjustment and recirculation back to lines 32. Steam for sterilization may be introduced at any convenient place, e.g. through valve-controlled line 36. Additional yeast from the yeast room may be introduced through valve-controlled line 37, if and as such additional yeast is needed.

The pump 19 should be such as to avoid damage to the yeast cells contained in the liquid passing therethrough. Too closely-fitting parts of the pump, coupled with excessively rapid motion thereof, may result in rupture of the cells as they pass through the vanes and other parts of the pump impeller and casing. It is therefore usually preferable to effect the desired thorough mixing of the yeast and wort by combining the effect of the pumping, through pump 19, with positive mixing, as by agitator 26, during the fermentation process. This assures uniform and thorough mixing of the batch without any damage to the yeast cells, and is an important factor in providing a completely uniform beer of desired characteristics.

It is to be clearly understood that this mixing which is accomplished by agitators 14, 26, 54, and 82 is such as to just keep the tank contents mixed—i.e. to prevent settling—and to insure isothermal, homogeneous conditions. All turbulence is avoided, especially in tank 22, and the liquid surface remains substantially level, without vortices. The use of baffles around the inside periphery of the tanks, as shown, is of considerable help in avoiding vortex formation. The mixing action also prevents build-up of stagnant film on the sides of the tanks. Vigorous agitation adversely affects fermentation, damages yeast cells, causes excessive frothing and loss of carbon dioxide, as well as of some other ingredients into the foam, and results in a poor-tasting product. The agitators themselves must of course be so designed as not to damage the yeast cells.

A valve-controlled exhaust duct 38 is provided at the top of the tank for removal of carbon dioxide as it forms during fermentation. This carbon dioxide may be vented, but is preferably recovered, e.g., for use in the following carbonating tank. Process and apparatus for thus recovering and reusing the carbon dioxide are well known.

After fermentation, the agitator 26 is stopped and the yeast allowed to settle. This yeast is drawn off through line 39 and delivered to hold tank 40, whence it is conveyed back into the process for reuse in conventional fashion. The fermented beer is then discharged from tank 22 through valve-controlled line 41 into yeast separation means 42, e.g., a centrifuge, wherein the yeast is removed and whence it is discharged through line 43. Depending upon the quality of this yeast, it may be passed to hold tank 40 through line 44, if it is of good quality, or be discharged from the system through line 46 if consisting mainly of dead cells. On the other hand, it is possible to remove all the yeast by separation means 42, but that is usually less desirable, as the settling step serves to separate automatically the better grade of yeast from the dead cells, as the latter tend to float in the beer without settling.

Means are provided for selectively removing foam accumulating on the surface of the fermenting liquid in tank 22. This can be accomplished simply by maintaining the surface of the fermenting liquid a predetermined depth below a discharge port such as line 38. In such event, because line 38 also serves to vent carbon dioxide, foam separator 47, is provided in line 38. While this arrangement will effectively remove foam which rises above the level of the discharge port, because the depth of foam remaining is predetermined by the substantially fixed distance between the port and liquid surface, this arrangement tends to impose sharp limitations on the total volume of fermenting liquid required. Thus, alternatively, foam removal is accomplished by providing float 33 positioned to float on the surface of the fermenting liquid and supporting line 31 which is flexibly connected to conduit 35, the latter being valved to discharge to waste-line 45. The inlet to line 31 will remain at a predetermined fixed level above the surface of the fermenting liquid regardless of variations, within obvious limits, of the level of the liquid in the tank.

Removal of foam through line 31 or line 38, as the case may be, as above-noted serves to control or reduce bitter flavor principles occurring in some types of beer fermentation.

The present invention provides for a given volume of liquid to produce a dense foam confined within a small surface area thus increasing the depth to volume ratio of the foam and facilitating its removal with minimum disturbance to the foam-liquid interface. The foam layer can be removed leaving a minimum residual foam that is desirable for the purposes of retaining surface characteristics favoring entrapment of solids which collect on the surfaces of rising gas bubbles, and preventing reentry of the solids into the liquid. Hence, the deep fermenter design provides an effective foam cover at minimum foam volume per liquid volume.

Because in making ale, the yeast is top fermenting and is removed from the surface of the liquid, either float 33 and line 31 can be used to effect the latter procedure, as by including another valve arrangement whereby line 35 can be diverted to discharge into line 39.

From the yeast separator 42 the resulting beer is conveyed through valve-controlled line 48 by pump 50 into carbonating tank 52 which is provided with agitator 54, conventional driving means 56 therefor, baffles 57 (similar to those in tank 22), and jacketing means 58 which in this instance is, for illustration, shown as surrounding the entire sides of tank 52. Temperature-controlling fluid such as brine, glycol or ammonia enters through line 60 and passes out, for temperature adjustment and recirculation, through line 61. Alternatively, the jacketing means around tank 52 may be only partial, as in the case of tank 22. Steam inlet 63 is provided, for the purpose as described with respect to tank 22. Purified carbon dioxide which as already stated may have been recovered from tank 22 through line 38 is introduced into tank 52 through line 62, and carbonation proceeds in the usual fashion. Gases are exhausted through valve-controlled line 64. Tank 52 is maintained at appropriate superatmospheric pressure, e.g., 10–15 p.s.i.g., and the temperature of the contents is kept slightly above freezing, e.g., 30 to 36° F.

The carbonated product is removed through valve-controlled line 70, impelled by pump 72, whence it passes into filter 74 for removal of any sludge formed in the carbonating step, and thence through valve-controlled line 78 to finishing tank 80. This tank is similar in arrangement to tank 22, having agitator 82, driving means therefor 84, and jacket means 86 provided with brine or other temperature controlling fluid introduced through line 88 and removed through line 89. Alternatively, the jacket means may be as shown for tank 52. Purified carbon dioxide, if desired, may be added through line 90, as is done through line 62 in tank 52. Steam for sterilizing may be introduced through valve-controlled line 91. This tank is commonly operated at about 15–20 lbs. gauge pressure. It is held at a temperature close to and just above the freezing point of the beer. This chiling action contributes to making the beer "chill-proof" by causing precipitation of proteinaceous and other substances that might otherwise cloud the bottled product on standing in a cool place.

It should be pointed out that the critical and most important aspect of this invention is that relating to the fermentation tank 22 and its characteristics and operation, as already described, and that the subsequent steps, after the fermentation step with foam removal, and the yeast removal, can be carried out in conventional or other fashion instead of that here described. Nevertheless, it is highly desirable that these subsequent steps, regardless of their order, be carried out in individual, separately-jacketed and temperature-controlled tanks of the type and dimensions of tank 22 (although they may be jacketed as tank 52), in order to provide the advantages herein referred to for such tanks.

The beer product is removed from tank 80 through valve-controlled line 92 provided with pump 94, whence it passes through filter 96 wherein substances precipitated in tank 80 are removed. Thence the beer passes through line 98 to the bottling plant.

Removable covers 99 seal manholes which are provided at the top of each of the tanks 12, 22, 52, and 80 in order to permit entrance of operators for cleaning or repair purposes.

The normal action in the deep fermentation process is a faster rate of fermentation than the process in shallow tanks because with the increased depth of the liquid, a larger percentage of yeast and solids remains suspended which in combination initiates a more vigorous fermentation that continues at a faster rate into a higher degree of attenuation. Consequently, because of the high degree of attenuation, the storage (aging time) can be substantially reduced. The continuous mixing provided by agitator 26 results in faster fermentation so that the fermenting process can be carried out in approximately 20% less time than without such agitation. As already pointed out, however, such mixing is not absolutely necessary as long as provisions are made for assuring thorough mixing of the yeast throughout the entire liquid mass within tank 22. While such mixing may be reasonably well performed through the action of pump 19, with increasing tank depth it is distinctly preferable to have the mixing means within the tank, such as agitator 26. The thorough mixing assures isothermal conditions and improves heat transfer through-out the liquid in the tank. Uniformity in the product is thus promoted. Other arrangements of agitators may be provided, e.g. several in large-diameter tanks. It is also possible, for example, to provide mixing by the introduction of carbon dioxide or other suitable gas through the bottom of tank 22.

The temperature within each of the tanks is controlled according to the type or characteristics desired in the beer product. Thus, in making lager, the temperature ranges between 35° and 65° F., generally around 55° F., while in making ale, the temperature ranges between 45° and 77° F., generally 68° F. As already pointed out, the temperature of each tank is controlled independently of the other tanks. It is thus possible, if desired, for one plant to run some of the tanks under one set of operating conditions and temperatures and other tanks under other conditions, and thus simultaneously to produce two separate kinds or qualities of beer. It is also possible to change at will the temperature cycle within any one or more tanks during processing, e.g., to start fermentation at a high temperature and then continue it at a lower temperature.

The tanks used in practicing this invention may be of any convenient diameter. The process works prefectly well in tanks as little as two feet in diameter even though as much as 40 feet deep or deeper. As a practical matter of construction, however, the depth and diameter dimensions should be fairly comparable, maintaining the reciprocal ratio of surface area to volume of liquid at least at 20. Upper limits of tank size are imposed by practical building considerations, rather than by the operability of the process. Thus, in a tank 70 feet deep the liquid pressure at the bottom is about 30 p.s.i.g., and the tanks must be built to resist pressure of that magnitude. Although the process of this invention can be carried out in such a tank, the problems of construction, space, and operating usually dictate a larger number of somewhat shorter tanks. Similarly, this process can be carried out in tanks of great diameter, e.g., 70–80 feet, but here again, structural considerations usually dictate tanks of somewhat lesser diameter. In the larger-diameter tanks more than one agitator is preferred in order to assure the desired circulation.

Stainless steel is a good material for the tank structures, or at least for inside cladding thereof. It is non-corrosive and provides the necessary strength, ease of cleaning and sterilizing, and inertness toward the contents.

The use of a sterilizable tank surface, e.g., stainless steel, together with the fact that the tanks are individually temperature-controllable, and the provision of steam inlet means 36, 63, and 91, makes it possible to produce a sterile beer product, if desired.

The following example, illustrative rather than limiting, will serve to provide additional detail:

EXAMPLE I

A feed of conventional formulation for making lager was charged from the starting tank to fill a large fermenting tank having a depth of 40 feet. Temperature within the fermenting tank was initially 44½° F. Agitator 26 was put into motion at 350 r.p.m. and continued for 96 hours, during which fermenting took place, the foam being removed as formed. Maximum temperature during fermentation averaged 58° F., in the usual manner of programmed attemperation to favor yeast flocculence and sedimentation. The fermented product was then settled for 4 days in situ, transferred to tank 52 and there carbonated at 32–33° F. and 6–8 p.s.i.g., and stored in that tank for 5 days, and finally finished for 5 days in tank 80, at 30–32° F. Filtering was carried out at filters 42 and 74, between each tank, and also at filter 96 following tank 80. After the latter filtration, the beer was bottled ready for use. Physical, chemical and organoleptic examinations of this product showed that this beer was of equal, if not superior, quality to beer produced by conventional processes.

The foregoing example may be modified in various ways, e.g., by providing a higher initial temperature, e.g., even as high as 60° F. Such higher temperature results in faster fermentation, but other conditions and results are substantially unchanged.

Various modifications may be made in the conditions of operation, within the scope of this invention, while providing a product of good quality. For example, the initial temperature may be as high as 58° F., although the average maximum is held to a fairly close range of about 57°–60° F. Final temperature at the end of the fermentation step in kept quite low, preferably 33–35° F. The fermenting and foam removal, settling, carbonating and finished steps may take somewhat more or less time than indicated above, ranging 4 to 5 days for each of the first two of those steps and 4 to 7 days for each of the last two of these steps. Beer depth may range from 20 feet to 50 feet, or even higher. Agitation, while preferably continued for 3 or 4 days, may be for as little as an hour, or even less, although product uniformity and quality, and ease of settling of the yeast, are improved with the longer agitation. Other sterilizing media than steam may be used for sterilizing the tanks, e.g., beta-propyl lactone, or peracetic acid.

What is claimed is:

1. A batch process for making beer, comprising the steps of subjecting a wort and yeast mixture to fermentation in the form of a liquid mass having a depth of at least twenty feet, controlling the temperature of said mass throughout a desired temperature cycle during said fermentation, and mixing said mass to provide isothermic conditions and homogeneity therein during said fermentation.

2. In a batch process for making beer, the improvement comprising the steps of maintaining a wort and yeast mixture during fermentation in a mass having a static depth of at least twenty feet, and controlling the temperature and continuously mixing the mass to provide isothermic conditions and homogeneity therein during fermentation.

3. In a process for making beer, the improvement as defined in claim 2 including the steps of continuously removing foam from the surface of said mass during fermentation.

4. A batch process for making beer, comprising the steps of subjecting a wort and yeast feed mixture to fermentation in a first zone, said mixture in said first zone having a depth of at least 20 feet, mixing said mixture during said fermentation to provide isothermic conditions and homogeneity therein, said mixing being effective to prevent settling, but sufficiently gentle to avoid turbulence and yeast cell damage, selectively removing foam formed on the surface of said mixture and after completion of said fermentation, removing the yeast from the resulting fermented mixture and then moving the resulting liquid mixture into a second zone, there subjecting it to a carbonating step; and controlling the temperature of the mixture in each of said zones independently of the temperature of the mixture in the other zones by out-of-contact heat exchange with a heat-transfer fluid.

5. A batch process for making beer, comprising the steps of subjecting a wort and yeast feed mixture to fermentation in a first zone, mixing said mixture during said fermentation to provide isothermic conditions and homogeneity therein, said mixing being effective to prevent settling, but sufficiently gentle to avoid turbulence and yeast cell damage, and after completion of said fermentation, continuously removing foam formed on the surface of the mixture during fermentation, removing the yeast from the resulting fermented mixture and then moving the resulting liquid mixture into a second zone, there subjecting it to a carbonating step, and then moving the resulting liquid mixture into a third zone, there subjecting it to a finishing step; and controlling the temperature of the mixture in each of said zones independently of the temperatures of the mixtures in the other zones by out-of-contact heat exchange with a heat transfer fluid; the mixtures in each of said zones having a depth of at least 20 feet.

6. A batch process for making beer, comprising the steps of subjecting a wort and yeast mixture to fermentation in a fermenter tank which confines the mixture to a liquid mass having a reciprocal ratio of surface area to volume of liquid at least 20 and having a depth of at least 20 feet removing foam during fermentation to maintain a minimum foam cover volume to liquid volume, controlling the temperature of said mass throughout a desired temperature cycle during said fermentation, and mixing said mass to provide isothermic conditions and homogeneity therein and keep the yeast in suspension in the wort to substantially the end of said fermentation.

7. A batch process for making beer, comprising the steps of subjecting a wort and yeast mixture to fermentation in the form of a liquid mass having a reciprocal ratio of surface area to volume of liquid at least 20 and having a depth of at least 20 feet, and controlling the temperature of said mass throughout a desired temperature cycle during said fermentation.

8. A process as defined in claim 7 including the step of removing foam during fermentation to maintain a minimum foam cover volume to liquid volume.

References Cited

UNITED STATES PATENTS 2,305,641  12/1942  Silhavy _____ 99—228 X

OTHER REFERENCES

Hind, H. L.: Brewing Science and Practice. Chapman and Hall, London, 1950 (Fig. 174, Fig. 175 (facing p. 893), pp. 839–840, pp. 848–850).

Vogel et al.: The Practical Brewer. Van Hoffmann Press, St. Louis, Mo., 1948 (pp. 102–104).

LIONEL M. SHAPIRO, *Primary Examiner.*

D. M. NAFF, *Assistant Examiner.*

U.S. Cl. X.R.

195—143